United States Patent
Olafsson et al.

(10) Patent No.: US 6,259,742 B1
(45) Date of Patent: Jul. 10, 2001

(54) METHODS AND APPARATUS FOR OPTIMIZING SHELL MAPPING TECHNIQUES USING AN APPROXIMATED POWER COST FUNCTION

(75) Inventors: Sverrir Olafsson; Olafur Orn Jonsson, both of Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 08/972,960

(22) Filed: Nov. 19, 1997

Related U.S. Application Data

(63) Continuation-in-part of application No. 08/760,646, filed on Dec. 4, 1996, now Pat. No. 6,081,555.

(51) Int. Cl.[7] .............. H04B 14/04; H04B 1/38
(52) U.S. Cl. ............................. 375/242; 375/222
(58) Field of Search ................... 375/242, 361, 375/222, 295, 259, 219; 341/144, 145, 155

(56) References Cited

U.S. PATENT DOCUMENTS

| | | | |
|---|---|---|---|
| 5,048,056 | * 9/1991 | Goldstein | 375/261 |
| 5,394,437 | 2/1995 | Ayanoglu et al. | 375/322 |
| 5,428,641 | 6/1995 | Long | 375/295 |
| 5,465,273 | 11/1995 | Cole | 375/296 |
| 5,528,625 | 6/1996 | Ayanoglu et al. | 375/222 |
| 5,838,724 | * 11/1998 | Cole et al. | 375/222 |
| 5,926,505 | * 7/1999 | Long | 375/222 |
| 6,031,873 | * 7/1999 | Williams | 375/259 |

FOREIGN PATENT DOCUMENTS

| | | |
|---|---|---|
| WO 96/18261 | 6/1996 | (WO) . |
| WO 99/26385 | 5/1999 | (WO) . |

OTHER PUBLICATIONS

Rife, D.C., "56 kbps Channels", *Telecommunications Industry Association*, Technical Subcommittee TR–30.3, Oct. 14, 1996.

Eyuboglu, V., "PCM Modems: A Technical Overview", *Telecommunications Industry Association*, Raleigh, NC, Oct. 16–17, 1996.

(List continued on next page.)

*Primary Examiner*—Chi Pham
*Assistant Examiner*—Khai Tran
(74) *Attorney, Agent, or Firm*—Snell & Wilmer L.L.P.

(57) ABSTRACT

To compensate for the substantially non-uniform spacing of constellation points in a pulse code modulation modem, the transmitting power efficiency is substantially maximized while substantially limiting the complexity of the mapping. To optimize the transmitting power efficiency, the present invention suitably determines an approximate cost function $g(n)$ to reduce the complexity and the $2^K$ lowest cost N-tuples $(m_0, m_1, \ldots, m_{N-1})$ for power transmission efficiency. Knowing the lowest cost N-tuples, fractional K data bits are systematically mapped uniformly onto the $2^K$ lowest cost N-tuples.

17 Claims, 5 Drawing Sheets

OTHER PUBLICATIONS

Krishnan, V., "V.pcm modem Standard", *Telecommunications Industry Association*, Raleigh, NC, Oct. 16–17, 1996.

Stuart, R., "Proposal for a High Speed Network Access Modem", *Telecommunications Industry Association*, Raleigh NC, Apr. 16–17, 1996.

Eyuboglu, M. Vedat., et al.; "Advanced Modulation Techniques for V.Fast"; *European Transactions on Telecommunications and Related Technologies*; May 1, 1993; vol. 4; No. 3; p. 247, paragraph 4.1.

Hodgkiss, B.; "DSP Implementation Considerations in High–Speed Telephone Modems"; DSP. Conference Proceedings; Dec. 3, 1997; pp. 77–84.

Long, G., "DC Suppresser for 56K Modems", *Telecommunications Industry Association*, Raleigh, Oct. 16–17, 1996.

Parizhsky, V., "U.S. Robotics'×2 Technology: Technical Brief", *Telecommunications Industry Association*, Raleigh, NC, Apr. 16–17, 1996.

Humblet, P.A., and Troulis, M.G., "The Information Driveway", Sep. 23, 1996.

Long, G., "Two–Step Mapping for 56 K Modems", *Telecommunications Industry Association*, Raleigh, Oct. 16–17, 1996.

* cited by examiner

METHODS AND APPARATUS FOR OPTIMIZING SHELL MAPPING TECHNIQUES USING AN APPROXIMATED POWER COST FUNCTION

RELATIONSHIP TO OTHER PATENT APPLICATIONS

This patent application is a continuation-in-part of patent application Ser. No. 08/760,646, entitled "Methods and Apparatus for Implementing Shell Mapping Techniques in the Context of a PCM-based Modem Communications System", filed on Dec. 4, 1996 by Sverrir Olafsson, now U.S. Pat. No. 6,081,555.

TECHNICAL FIELD

The present invention generally relates to shell mapping schemes used in the transmission of digital information over an analog medium connected to a digital network, particularly in the context of Pulse Code Modulation (PCM) modems. More specifically, the present invention relates to a mapping scheme for maximizing transmitting power efficiency while substantially limiting the complexity of the shell mapping. An exemplary embodiment of the present invention relates to the calculation of an approximated cost function $g(n)=2^n$, where $n \in \{0, \ldots, M-1\}$ is the ring index, and the determination of the $2^K$ lowest cost ring indices for power transmission efficiency.

BACKGROUND ART AND TECHNICAL PROBLEMS

The world based on the Internet has seen tremendous growth in recent months. As more users begin browsing and downloading information from the World Wide Web, there has been a great desire to increase the data transmission rate, or simply called data rate. The desire is even greater for users accessing the Internet through an Internet service provider (ISP), since most users are linked up to the "Net" through a personal computer and a modem. Conventional analog modems, such as V.34 modems, however, view the public switched telephone network ("PSTN") as an analog channel, even though the signals are digitized for communications throughout most of the PSTN. As such, various effects of and impairments due to signal quantization impose a limitation on the data rate of the channel to about 35 kbps. This limit has been commonly known as Shannon's Limit. (See C. E. Shannon and W. Weaver, *The Mathematical Theory of Communication,* University of Illinois Press, 1949).

There has been much recent development of high-speed communications technology based on PCM modems, where data rates of at least 56 kbps are said to be actually attainable. The PCM modem technology is based on the simple realization that the PSTN is increasingly a digital network and not an analog network. Also, more and more central site modems are connected to the PSTN through digital connections, i.e., T1 in the U.S. and E1 in Europe, without requiring a CODEC (coder/decoder). A CODEC is a device which connects the digital portion of the network to the analog local loop and converts between analog and digital.

The conventional modem, however, still interprets this digital stream as the representation of the modem's analog signal. With the PCM modems, however, a much higher data rate can be achieved without the complicated task of re-wiring the user's site or modifying the telephone network. It should be recognized that "central site" modems refer to those modems installed at an ISP, or at a corporation, for example, to allow many simultaneous connections for remote local area network (LAN) access.

The recent 56 kbps technology seeks to address an impaired section of the communications path of the PSTN digital network, where the impairment is due to the hybrid and the copper wire interface between the telephone central office and the user's home, usually referred to as the analog local loop.

Since recently, much has been described about PCM modems and how they can and should facilitate downstream data communication at a much higher rate than the present paradigm. For example, the PCM modem has been the subject of a recent Telecommunications Industry Association (TIA) Technical Committee TR-30 Standards meeting on Oct. 16–17, 1996. The submitted technical contributions include Guozhu Long's *DC Suppressor for 56K Modems,* Guozhu Long's *Two-Step Mapping for 56K Modems,* David C. Rife's *56 kbps Channels,* Veda Krishnan's *V.pcm Modem Standard,* Vedat Eyuboglu's *PCM Modems: A Technical Overview,* Richard Stuart's *Proposal for a High Speed Network Access Modem,* and Vladimir Parizhsky's *U.S. Robotics' x2 Technology: Technical Brief.* These contributions are hereby incorporated by reference.

Also, there have been recent publications on the overall data communication system based on the PCM modem. The first one is a 1995 presentation disclosed by Pierre A. Humblet and Markos G. Troulis at Institute Eurecom, entitled *The Information Driveway,* 1995, which purports to explain the basic concepts of the high speed modem. The second one is a PCT Patent Publication, dated Jun. 13, 1996, International Publication Number WO/9618261, by Brent Townshend, which discloses a High Speed Communications Systems for Analog Subscriber Connections. This Publication, on pages 17–19, discloses an overall high speed system based on PCM modems (which also implements DC null elimination on the transmitter side). These papers provide a fair reference to the basics of the high speed PCM modems and their environment, and are hereby incorporated by reference.

Additionally, U.S. Pat. No. 5,528,625, issued to Ender Ayanoglu of AT&T, dated Jun. 18, 1996, entitled High Speed Quantization-Level-Sampling Modem With Equalization Arrangement, discloses a QLS modem for high-speed data communication. Another U.S. patent also issued to Ender Ayanoglu of AT&T, U.S. Pat. No. 5,394,437, dated Feb. 28, 1995 entitled High-Speed Modem Synchronized To A Remote CODEC, discloses a high-speed modem for data transmission over an analog medium in tandem with a digital network. These references are also hereby incorporated by reference.

FIG. 1 depicts a conceptual diagram of the typical high-speed communication path using PCM modem technology. An ISP, or central site, 100 is digitally connected to a telephone network 130 through a transmitter 110 and a receiver 120 of an ISP modem 105. The network 130 is connected to a local loop 150 through a central office line card 140. The line card typically has a PCM CODEC implemented therein. The local loop 150 is connected to the user's PC at the user's site through the user's modem 160. As can be appreciated by those skilled in the art, the connection between the ISP modem transmitter 110 to the telephone network 130 is a digital connection with a typical data rate of about 64 kbps. Since the parameters of the telephone network 130 and line card 140 are dictated and set by the telephone company's specifications and operation (and particularly their use of the μ-law signal point constellation), the central site transmitter 110 needs to transmit the digital data in a particular way to fully exploit its digital connection to the network. However, dealing with μ-law constellations, shell mapping, and PCM-based modem systems in this new paradigm has some obstacles.

For example, in the V.34 paradigm, the shell mapping algorithm is essentially designed to select ring indices in a manner which minimizes average transmission power based on, inter alia, the assumption that the average power of each ring is approximately proportional to its ring index, and based on the further assumption that any particular constellation can be scaled to meet the transmit power level requirement. In a PCM modem context, on the other hand, the signal points are selected from a fixed, non-uniformly spaced set of levels determined by the PCM codec in accordance with the well-known μ-law algorithm. Hence, the above assumptions made for the V.34 shell mapping algorithm break down in the context of PCM modems. Furthermore, in order to obtain optimum performance using known shell mapping techniques, an entirely new cost function different from the cost function employed in V.34 would have to be defined, and a new mapping algorithm constructed for use in a PCM modem context. The implementation of such a new cost function and mapping algorithm would not significantly exploit the V.34 algorithm, which is currently utilized by a substantial number of modems currently in use. In the V.34 signal-point encoding model, typically employed by a transmitting modem at an Internet service provider (ISP server), the encoder function is often divided into two realms, including a coding part and a mapping (or shaping) component. The coding component often involves error-correction coding, whereas the mapping component strives to minimize the transmission power in view of the restraints imposed by the coding process. For example, the traditional V.34 coding function involves the use of convolutional trellis codes, whereas the mapping is in the form of shell mapping.

The shell mapping algorithm employed in V.34 is one of the more complex functions in a V.34 modem. For a more complete description of the V.34 Recommendation, see *ITU-T Recommendation V.34*, published September 1994 by the International Telecommunication Union, the entire contents of which is hereby incorporated by this reference. Essentially, the V.34 encoding algorithm takes a block of bits corresponding to a mapping frame of eight (8) symbols, and maps a part of that block to a set of eight (8) ring indices, which are used to determine a subset of the constellation from which the transmitted signal points are selected. In this context, the subsets are, as the name indicates, in the form of concentric rings around the origin. As such, the energy of the signal points in a given ring is within a certain range, which energy range increases with increasing distance from the origin. Thus, the index of the ring is a fairly accurate approximation of the contribution to signal power of a point in that ring. The V.34 shell mapping algorithm uses this simple relationship to select sets of ring indices where the sum of the indices is the smallest. Sets of ring indices with higher sums tend to be omitted, thus optimizing transmit power. As a result, in the V.34 shell mapping algorithm, the innermost rings are selected most often, and the outermost rings are selected least often.

In PCM modems, however, the signal points are selected from a non-uniform set of levels determined by the flaw algorithm. Many of the characteristics of the V.34 constellation are therefore lost in a PCM modem context, for example the linear relationship between ring index and that ring's contribution to transmission power.

Furthermore, due to the substantially fixed and substantially non-uniform spacing of constellation points in the PCM modem, prior art shell mapping methods typically yield insufficient results. More particularly, the substantially non-uniform spacing often results in inconsistent and inefficient power transmission. A method for maximizing transmitting power efficiency is needed; however, maximizng the transmitting power efficiency with exact values for ring energy typically requires complex mapping algorithms.

U.S. Pat. No. 5,428,641, issued Jun. 27, 1995 to Long, and U.S. Pat. No. 5,465,273, issued Nov. 7, 1995 to Cole, generally disclose shell and frame mapping techniques that may be used in conjunction with modems and, more specifically, with V.34 transmission protocols. Both of these patents are hereby incorporated by reference. Guozhu Long's contribution to the TR-30 Standards Meeting, entitled *Two-Step Mapping for 56 K Modems*, discloses a shell mapping algorithm intended to replace the standard V.34 mapping algorithm. Long's mapping technique is designed to reduce the error rate associated with 56 K modems. However, such use of a new mapping algorithm may be impractical to implement or undesirable in light of the widespread use of the V.34 mapping algorithm.

A technique is therefore needed which overcomes the shortcomings of the prior art. In particular, a long felt need exists for a PCM-based signal point encoding methodology which conforms to the transmission power limitations imposed by the Public Switched Telephone Network (PSTN), which facilitates the minimization of transmission errors, and which exploits many of the advantageous features of the V.34 shell mapping algorithm.

SUMMARY OF THE INVENTION

The present invention provides methods and apparatus for implementing a shell mapping algorithm in the context of a PCM modem. In accordance with a preferred embodiment of the present invention, to compensate for the substantially non-linear cost associated with the PCM constellation, the transmitting power efficiency is substantially maximized while substantially limiting the complexity of the mapping. To optimize the transmitting power efficiency, the present invention suitably calculates an approximate cost function $g(n)$ and suitably determines the $2^K$ lowest cost N-tuples $(m_0, m_1, \ldots, m_{N-1})$. Knowing the lowest cost N-tuples, fractional K data bits are systematically mapped uniformly onto the $2^K$ lowest cost N-tuples, thereby achieving optimum power efficiency.

The above and other advantages of the present invention may be carried out in one form by an exemplary shell mapping apparatus having an input means for receiving digital data, a means for determining the lowest cost rings in accordance with an approximated cost function $2^n$, and an output means for mapping these ring indices onto the digital data.

BRIEF DESCRIPTION OF THE DRAWING FIGURES

Additional features and advantages of the subject invention are hereinafter described in conjunction with the appended drawing figures, wherein like numerals denote like elements, and:

DETAILED DESCRIPTION OF PREFERRED EXEMPLARY EMBODIMENTS

In accordance with the preferred exemplary embodiments described herein, methods and apparatus are provided for implementing an optimized shell mapping algorithm in accordance with various algorithms, goals, and cost function considerations described herein. In accordance with a preferred embodiment of the present invention, a shell mapping algorithm is suitably performed such that power transmitting efficiency is substantially maximized while the computational complexity associated with the mapping procedure is substantially minimized. More particularly, a preferred embodiment of the present invention suitably defines an approximate cost function $g(n)=2^n$, where $n \in \{0, \ldots, M-1\}$ is the ring index, from which the $2^K$ lowest cost N-tuples $(m_0, m_1, \ldots, m_{N-1})$ are derived. In a particularly preferred embodiment, N is set to eight, and a method of deriving the lowest cost 8-tuples is provided in accordance with the present invention.

A general description of the operation of an exemplary PCM-based modem transmitter will now be provided, followed by a more detailed discussion of the components, derivations, and steps preferred for implementation of an optimized shell mapping algorithm in accordance with the present invention.

Figure 1:
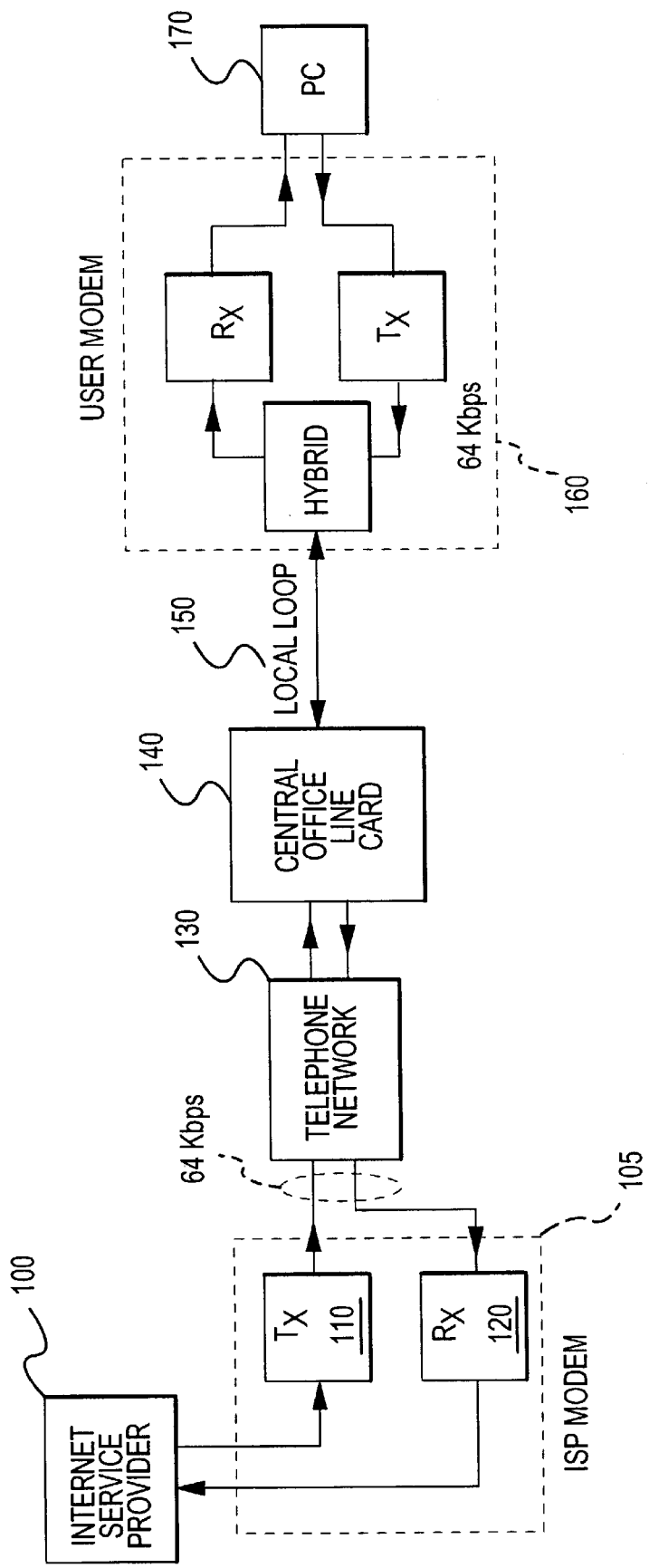
FIG. 1 depicts a conceptual diagram of a typical high-speed communication path using PCM modem technology.
Figure 2:
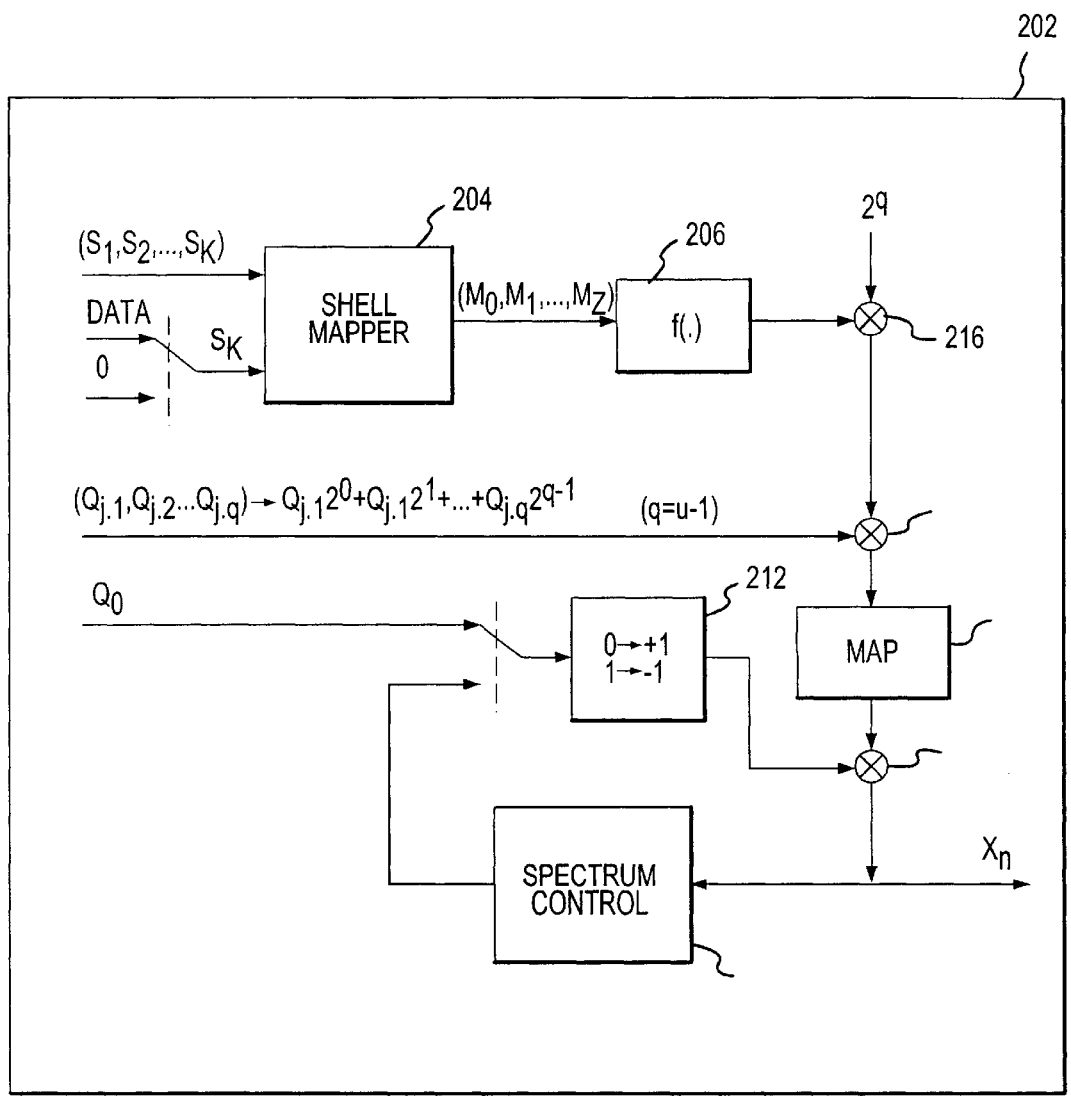
FIG. 2 is a block diagram of the shell mapping, reordering, and signal point constellation look up table components of an exemplary signal point encoder in accordance with the present invention.

Referring now to FIGS. 1 and 2, an exemplary PCM-based modem transmitter 110 suitably comprises a signal point encoder 202. In the illustrated embodiment, signal point encoder 202 comprises a shell mapper 204, a reordering look up table 206, a mapping block 208, a spectrum control circuit 210, and a polarity block 212. Those skilled in the art will appreciate that the various functional components of encoder 202, including shell mapper 204, reorder look up table 206, signal constellation mapping look up table 208, polarity block 212, and spectrum control 210 may suitably be implemented as one or a combination of discrete electronic components, integrated circuits, software modules, or any other convenient implementation.

In the preferred embodiment described herein, an exemplary mapping frame may be illustrated as follows:

TABLE 1

Allocation of bits in a mapping frame

| K | u | u | u | u | u | u | u | u |
|---|---|---|---|---|---|---|---|---|
| ⇐--------X--------X--------X--------X--------X--------X--------X--------⇒⇐--------⇒ |
| Shell Mapper | Sample | Sample | Sample | Sample | Sample | Sample | Sample | Sample |
| ⇐---------------- | | | | | | | | ----------------⇒ |
| First in time | | | | | | | | Last in time |

Those skilled in the art will appreciate that the actual data to be transmitted by the modem through the PSTN to the receiving modem may be formatted and transmitted via any convenient methodology, for example as described in ITU Standard V.42, incorporated herein by this reference.

With continued reference to the above mapping frame, an exemplary mapping frame useful in conjunction with the present invention comprises eight PCM samples per mapping frame, corresponding to a total of b bits. Of these b bits, the first K bits of a mapping frame may be conveniently used for the shell mapper (with a zero inserted for low mapping frames), and the following b-K bits are suitably divided in eight equal parts with u bits in each part depending on such factors as data rate, redundancy level, and the like. In the context of the present invention, a redundancy value of sixteen means that in one out of every sixteen samples, one bit is used for redundancy purposes.

Referring now to FIG. 2, the first K bits of a mapping frame $(S_1, S_2, \ldots, S_K)$ are mapped into a set of N ring indices $(m_0, m_1, \ldots, m_{N-1})$ by shell mapper 204, where N is the mapping frame size. In a preferred embodiment, the frame size is chosen to be eight, and the first K bits of the mapping frame are mapped into a set of 8 ring indices $(m_0, m_1, \ldots m_7)$. In this regard, note that the values $Q_{j,1}, Q_{j,2}, \ldots, Q_{j,u-1}$ will ultimately be chosen from a constellation of points which are partitioned into rings. More particularly, consider the following exemplary partial signal constellation for 56 kbps:

TALE 2

Example 56 kps Constellation 6, 18, 30, 45, 57, 69, 81, 93
107, 123, 139, 155, 171, 187, 203, 219
231, 247, 263, 279, 295, 311, 327, 343
359, 375, 391, 407, 423, 439, 455, 471
495, 527, 559, 591, 623, 655, 687, 719
751, 783, 815, 847, 879, 911, 943, 975
1023, 1087, 1151, 1215, 1279, 1343, 1407, 1471
1535, 1599, 1663, 1727, 1791, 1855, 1919, 1983
2079, 2207, 2335, 2463, 2591, 2719, 2847, 2975

It will be appreciated that the above signal constellation corresponds to set A, that each point within the 56 kbps signal constellation is also selected from the set of μ-law values, and that each horizontal line in the constellation corresponds to a ring index (m). To simplify the description, only the positive half of the constellation is shown; the symmetry of the system is such that, if constellation point $P_k$ is a member of a ring, then $-P_k$ is also a member of a ring.

Referring again to FIG. 2, shell mapper 204 suitably maps the first K bits of a mapping frame into a set of eight ring indices ($m_0, m_1, \ldots, m_7$). In accordance with the present invention, this mapping is performed in a manner which substantially optimizes a specific cost function. More particularly, a cost function is derived which closely approximates an exact power cost function, yet remains relatively non-complex from a computational standpoint. Specifically, an approximate cost function is advantageously defined as $g(n)=2^n$, where $n \in \{0, \ldots, M-1\}$ is the ring index. The $2^K$ lowest cost 8-tuples ($m_0, m_2, \ldots, m_7$) are then derived from this function. The manner in which this cost function is derived and implemented is described in detail below in conjunction with FIG. 3.

Having generated eight ring indices ($_1m_2, \ldots, m_7$) via shell mapper 204, these indices are suitably applied to a reordering look up table 206. Such reordering might be employed as an additional step to further optimize performance, e.g., to allow optimum use of ring indices having signal points spaced apart by $d_{min}$, while maintaining average transmission power within desired limits. Such ring reordering may be suitably arrived at through an iterative process which incrementally shifts the rings containing signal points separated by $d_{min}$ to progressively lower assignments (in terms of frequency of occurrence), until acceptable average power ranges are satisfied. In a preferred embodiment, where an optimized shell mapping algorithm is implemented as set forth below, this reordering step need not be performed.

The ring indices output from module 206 (or, if no module 206 is used, the ring indices output from module 204) are suitably applied to a multiplier 216, which advantageously shifts the ring indices to the left by a desired number of bits, as is known in the art. The left-shifted, reordered ring indices are then summed with the mapping values ($Q_{j,1}, Q_{j,2}, \ldots, Q_{j,u-1}$) at summer 214. The output of summer 214, the signal point index, is suitably applied to mapping module 208, wherein the appropriate signal values are selected. Given a table of signal points as in Table 2, the signal point index represents an index directly determining which signal point is selected from the table. More particularly, mapping module 208 suitably comprises a unique, predetermined signal constellation for each anticipated data rate.

Once the signal point indices values are mapped to the signal constellation points in mapping module 208, the output from module 208 is suitably applied to a multiplier 218, whereupon a polarity bit from polarity module 212 is combined with the output of mapping module 208 to ensure that the encoded signal output from multiplier 218 includes the appropriate polarity.

Spectrum control unit 210 suitably controls the spectrum of the transmitted PCM signal by modifying the sign of every rth sample based on an objective function of $C_n$, where:

$$C_n = \sum_{m=0}^{n} x_m.$$

Thus, the metric $C_n$ is calculated for each output sample $x_n$, and the sign of every rth sample is determined by considering $C_n$. If $C_n$ is negative, the bit $Q_{j,0}$ is set to zero and the outgoing sample is thus positive. If $C_n$ is positive or zero, $Q_{j,0}$ is set to one and the outgoing sample becomes negative. In the preferred embodiment, a redundant-sign algorithm is used for spectrum control. A more detailed description of such an algorithm is set forth in a United States patent application entitled *System for Controlling and Shaping the Spectrum and Redundancy of Signal-Point Limited Transmission*, by Sverrir Olafsson, Zhenyu Zhou, and Xuming Zhang, filed on or about Nov. 27, 1996, Ser. No. 08/757,383. The above-identified patent application is hereby incorporated by reference. Those skilled in the art will appreciate that other suitable algorithms may be implemented in spectrum control unit 210.

Having thus described the general operation of an exemplary PCM modem transmitter in the context of the present invention, a preferred cost function derivation and an exemplary manner of implementing an algorithm exploiting this cost function will now be described.

Given a PCM constellation divided into M rings $a_0, \ldots, a_{M-1}$, the distance between points in ring k is preferably expressed as $d_k = 2^{k*} a_0$. That is, points in outer rings (corresponding to higher values of k) are necessarily farther apart. Specifically, the distance between points in a ring is exponentially related to ring number and directly related to a constant $a_0$.

One skilled in the art will realize, however, that this relation holds true only if PCM-segments and rings coincide, i.e., when PCM segments are chosen such that they divide between rings. More particularly, the μ-law PCM constellation comprises a total of 255 signal levels which are divided into sixteen segments, each segment comprising sixteen points. In some cases it might be desirable to more finely divide constellations into rings, for example, by using eight points per ring rather than sixteen (as illustrated by the exemplary constellation set forth in Table 2). As will be detailed below, such finer divisions result in a different power cost function estimation.

Assuming, now, that ring zero ends at a value b, then the approximate distance to the beginning of ring k is given by $(2^{k+1}-1)b$, where the $2^{k+1}-1$ term is essentially a summation of the lengths of the rings up to ring k. In this continuous approximation, ring k ends at $(2^{k+1}-1)b$ where ring k+1 begins as shown in Table 3 below. Note that the relation governing the distance to the rings is similar in form to that governing the distance between points in a ring.

TABLE 3

Assumptions related to ring characteristics

| Ring Number | Begins at | Ends at | Length |
|---|---|---|---|
| 0 | 0 | b | b |
| 1 | b | 3b | 2b |
| 2 | 3b | 7b | 4b |
| ... | ... | ... | |
| k | $(2^k - 1)b$ | $(2^{k+1} - 1)b$ | $2^k b$ |

It will be appreciated by those skilled in the art that the relation governing the distances to the rings can be generalized as:

$$P_k = \frac{1}{a_2 - a_1} \int_{a_1}^{a_2} x^2 dx,$$

where $a_2 = f(k+1)$, $a_1 = f(k)$, and $f(k)$ is an exponential function in k.

In a preferred exemplary embodiment, an approximation of the mean power P in ring zero is can be expressed as:

$$P_0 = \frac{1}{b}\int_0^b x^2 dx = \frac{1}{3}b^2.$$

More generally, an approximation of the power in ring k is given by:

$$P_k = \frac{1}{(2^{k+1} - 2^K)b}\int_{(2^k-1)b}^{(2^{k+1}-1)b} x^2 dx = (7\cdot 2^{2k} - 9\cdot 2^k + 3)*P_0.$$

It might appear, then, that this resulting equation for $P_k$ may itself be advantageously used as a cost function for implementing a shell mapping algorithm. Upon further inspection, however—and particularly in light of implementation details set forth below—it should be clear that the form of this equation renders it prohibitively complex as a basis for a fast, easy to implement, real-time shell mapping algorithm.

What is needed then is a cost function approximation which is both reasonably precise and easy to implement. Toward this end, it will be appreciated that any error present in modeling the ideal cost function would likely be larger at higher power levels (i.e., higher ring indices) than at lower power levels (i.e., lower ring indices). Therefore, a power function approximation is required which, while tailored to optimize the outer rings, need only be adequate for lower rings. With this in mind, it is apparent that for large values of k, the $7*2_2^{2k}$ term in the above equation for $P_k$ dominates. When k=8, for example, the $2^{2k}$ term is approximately 250 times greater than the $2^k$ term. Thus, when rings and PCM segments coincide, the relation $P_k 2^{2k}$ is a preferable approximation of the power function. When the rings do not coincide with PCM segments (as discussed above), it can similarly be shown that $P_k 2^{(2-(s-q))k}$ is a preferable approximation, where the number of points per ring is $2^q$ (q $\in$ {3,4}) and the number of points per segment is $2^s$ (where s=4).

In a particularly preferred embodiment, we choose a $\mu$-law constellation where q=3 (eight points per ring) and s=4 (sixteen points per segment). In such a case, the relation $P_k 2^k$ is a suitably accurate approximation for computing ring costs, and a cost function g(n) is defined such that:

$g(n)=2^n$.

Having thus derived the cost associated with choosing each ring in accordance with the particularly preferred embodiment, K data bits may be systematically mapped uniformly onto the $2^K$ lowest cost N-tuples $(m_0, m_1, \ldots, m_{N-1})$, $m \in \{0, \ldots, M-1\}$.

To do so, a generating polynomial G(x) for the cost function g(n) is defined using the approximated cost function, such that:

$$G(x) = \sum_{j=0}^{M-1} x^{s(j)} = x + x^2 + x^4 + \ldots + x^{2^{M-1}} = \sum_{i=0}^{2^{M-1}} g_1(i)x^i,$$

where $g_1(i)$ is the number of single rings which have an associated cost i. For the purposes of the $2^n$ cost function approximation, $g_1(i)$ can be expressed as:

$$g_1(i) = \begin{cases} 1 & \text{if } i = 2^j, \ j \in \{0, 1, \ldots, M-1\} \\ 0 & \text{otherwise} \end{cases}.$$

That is, $g_1(i)$ is essentially a binary function equal to one where i is a power of two (for example, i=1, 2, 4, 8, etc.), and zero for all other values (for example, i=0, 3, 5, etc.). Now, since:

$G_n(x) = [G(x)]^n = \Sigma g_n(i) x^i$, we can derive the function $g_2(i)$, which represents the number of two-ring combinations with a total cost of i, as:

$g_2(i) = g_1(0)g_1(i) + g_1(i-1) + \ldots + g_1(i)g_1(0)$.

For example, consider a set of five rings with indices 0, 1, 2, 3, and 4, having ring costs of 1, 2, 4, 8, and 16 respectively. If we were to determine the number of two-ring combinations within this set having a cost equal to five, we would find that all terms in the preceding equation would drop out except for $g_1(1)g_1(4)$ and $g_1(4)g_{1L}(1)$, giving us a $g_2(i)$ value of two. Thus, there are two combinations of rings, ring pairs (0,2) and (2,0), which give a combined cost of five.

Similarly, $g_4(i)$, the number four-ring combinations equal to i, can be derived as:

$g_4(i) = g_2(0)g_2(i) + g_2(1)g_2(i-1) + \ldots + g_2(i)g_2(0)$, and $g_8(i)$, the number of eight-ring combinations equal to i, is given by:

$g_8(i) = g_4(0)g_4(i) + g_4(1)g_4(i-1) + \ldots + g_4(i)g_4(0)$.

It is easily shown, then, that the number of eight-ring combinations with a cost less than i is given by:

$$z_8(i) = \sum_{j=0}^{i-1} g_8(j).$$

Figure 3:
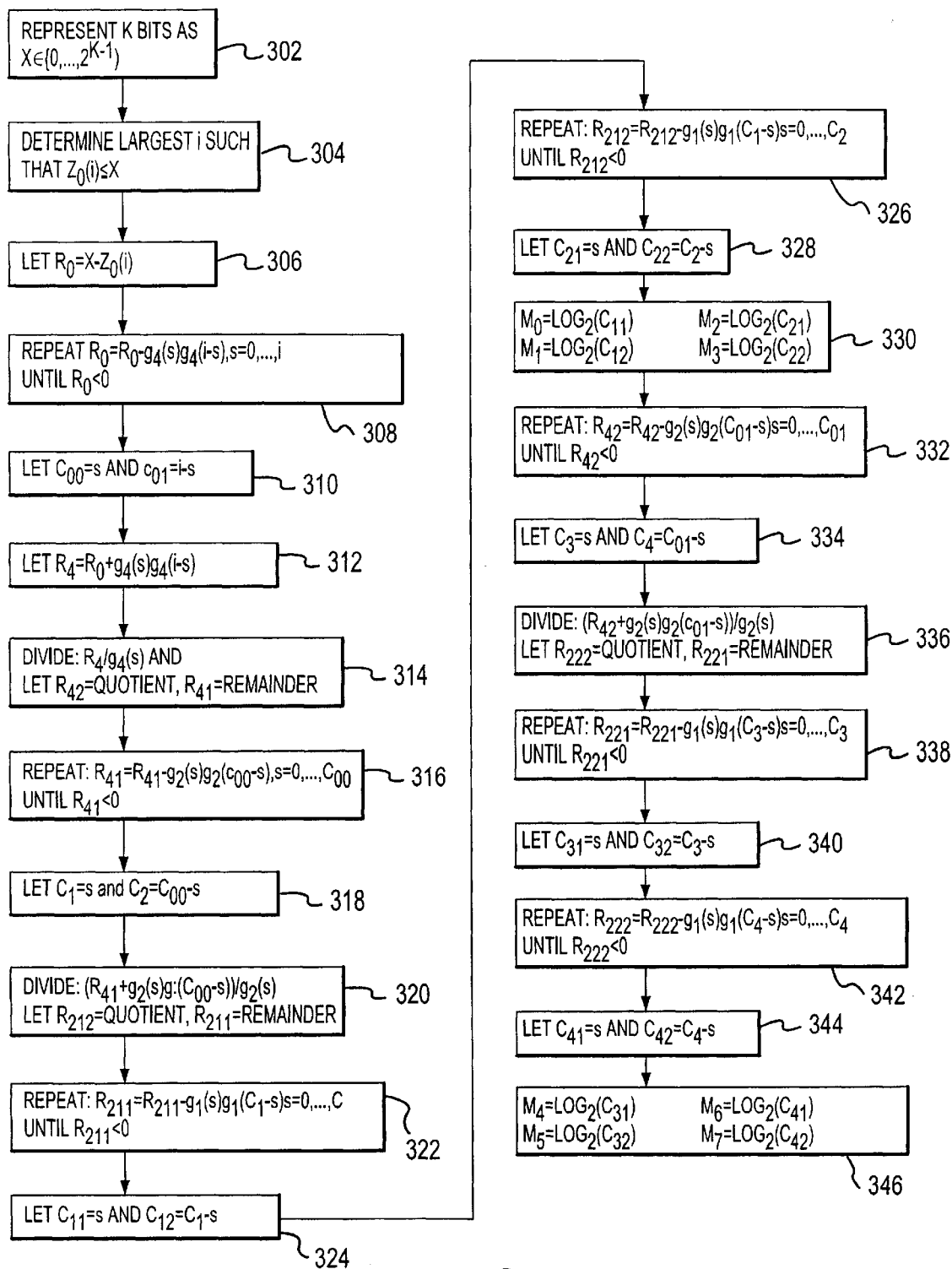
FIG. 3 is a flow chart describing the shell mapping algorithm for mapping K bits substantially uniformly onto the $2^K$ lowest cost 8-tuples $(m_0, m_1, \ldots, m_7)$ in accordance with a preferred embodiment of the present invention.

Having derived the various relations necessary to implement a shell mapping routine in accordance with a preferred embodiment of the present invention, a preferred method of mapping K bits onto the $2^K$ lowest cost 8-tuples will now be described in conjunction with FIG. 3.

It will be appreciated that while the preferred exemplary embodiment set forth below contemplates a mapping frame size of eight (i.e., N=8), the illustrated method may be easily modified by those skilled in the art to address larger or smaller frame sizes.

In Step 302, the first K bits are suitably represented as a number $x \in \{0, \ldots, 2^K-1\}$ where:

$x = S_1 + 2^1 S_2 + 2^2 S_3 + \ldots + 2^{K-1} S_K$.

Next, the largest i is suitably determined such that $z_8(i) \leq x$ (Step 304), and $R_8$ is set equal to $x - z_8(i)$ (Step 306). Here, i becomes the total cost of the 8-tuple.

Figure 4:
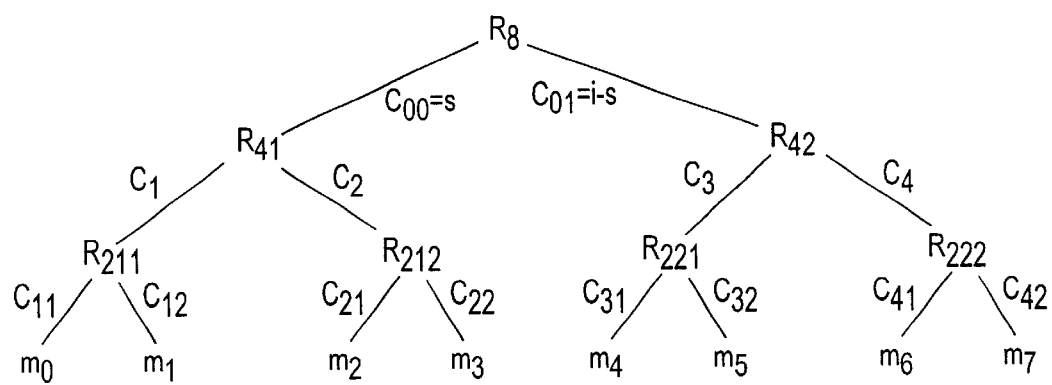
FIG. 4 is schematic tree diagram showing the hierarchy of values and parameters computed by a shell mapping algorithm in accordance with a preferred embodiment of the present invention.

In a general sense, and with momentary reference to FIG. 4, it is instructive to note that the procedural flow set forth below will be used to define a hierarchy of coefficients and values which will be used to determine subsequent values in the illustrated tree structure. Hence, $R_8$ will be used to compute $R_{41}$, and $R_{42}$, $R_{41}$ will be used to compute $R_{211}$, and so on.

Referring again to FIG. 3, having computed $R_8$ and i in Steps 304–306 above, the values of $R_{41}$, $R_{42}$, $c_{00}$ and $c_{01}$ are suitably derived. First, The value of $R_8$ is repeatedly decremented by the product $g_4(s)g_4(i-s)$, where s=0, ..., i, until $R_8$ becomes negative (Step 308). When $R_8$ becomes negative, $c_{00}$ and $c_{01}$, are defined such that $c_{00}=s$ and $c_{01}=i-s$ (Step 310). The value $g_4(s)g_4(i-s)$ is then added back to $R_8$ (Step 312), and the resulting value is assigned to $R_4$ such that $R_4$ is represented as $R_4 = R_{42}g_4(s) + R_4$; that is, when $R_4$ is suitably divided by $g_4(s)$, $R_{42}$ is the quotient and $R_{41}$ is the remainder (Step 314).

Similarly, $R_{41}$ is repeatedly decremented by the product $g_2(s)g_2(c_{00}-s)$, where $s=0, \ldots, c_{00}$, until $R_{41}$ becomes negative (Step 316). In other words, Steps 308–314 are preferably repeated with $R_{41}$ instead of $R_g$, $c_{00}$ instead of i, and $g_2$ instead of $g_4$ thereby suitably deriving values for $R_{211}$, $R_{212}$, $c_1$ and $c_2$. Thus, because $c_1 + c_2 = c_{00}$, $c_1$ and $c_2$ are defined such that $c_1 = s$ and $c_2 = c_{00} - s$ (Step 318). In Step 320, the term $R_{41} - g_2(S)g_2(C_{00}-s)$ is divided by $g_2(s)$, and $R_{212}$ is set equal to the quotient and $R_{211}$ is set equal to the remainder.

The value $R_{211}$ is then repeatedly decremented by the product $g_1(s)g_1(c_1-s)$, where $s=0, \ldots, c_1$, until $R_{211}$ becomes negative (Step 322). In other words, Steps 308–314 are preferably repeated with $R_{211}$ instead of $R_8$, $c_1$ instead of i, and $g_1$ instead of $g_4$. Thus, $c_{11} = s$ and $c_{12} = c_1 - s$ (Step 324).

The value $R_{212}$ is then repeatedly decremented by the product $g_1(s)g_1(c_2-s)$, where $s=0, \ldots, c_2$, until $R_{212}$ becomes negative (Step 326). In other words, Steps 308–314 are preferably repeated with $R_{212}$ instead of $R_8$, $c_2$ instead of i, and $g_1$ instead of $g_4$. Thus, $c_{21} = s$ and $c_{22} = c_2 - s$ (Step 328).

Next, from $c_{11}$, $c_{12}$, $c_{21}$ and $c_{22}$, the respective costs $m_0$, $m_1$, $m_2$, and $m_3$ are suitably calculated as $m_0 = \log_2(c_{11})$, $m_1 = \log_2(c_{12})$, $m_2 = \log_2(c_{21})$, and $m_3 = \log_2(c_{22})$, respectively (Step 330). Note that because the cost function previously derived in accordance with the present invention is a power of two, the resulting cost calculation (a simple log function) is easy to implement.

Finally, to obtain the remaining four tuples $(m_4, \ldots, m_7)$, Steps 316–330 are suitably repeated using $c_{01}$ instead of $c_{00}$ in Steps 316–320.

It will be appreciated that the foregoing method may be easily extended to other values of N (e.g., N=6). That is, a set of intermediate values $c_{ij}$ may be derived in accordance with the present invention, where:

$$i \in \left\{1, \ldots, \frac{N}{2}\right\}, j \in \{1, 2\},$$

and a set of lowest cost N-tuples $(m_0, m_1, m_2, \ldots, m_{N-1})$ are defined as $m_0 = \log_2(c_{11})$, $m_1 = \log_2(c_{12}), \ldots, m_{N-2} = \log_2(c_{N/2,1})$, and $m_{N-1} = \log_2(c_{N/2,2})$.

Figure 5:
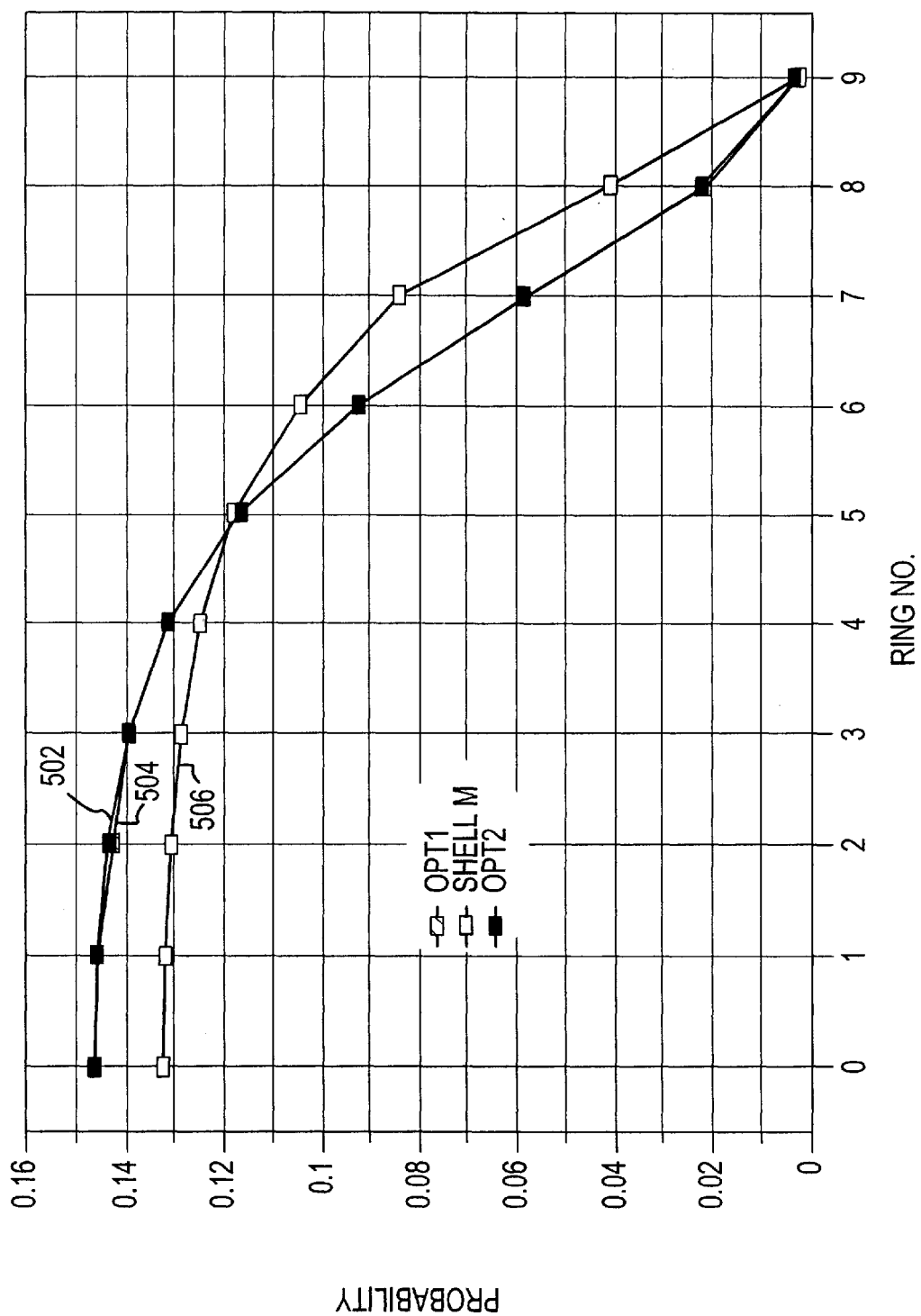
FIG. 5 is a graphical representation of the probability of each ring number resulting from the specific parameters in accordance with the preferred mapping functions of the present invention.

The desirability of the foregoing method will now be illustrated in conjunction with FIG. 5. More specifically, an exemplary case of the procedure discussed above is performed wherein 24.5 bits are mapped onto 8-tuples of rings, M=10 rings, and the constellation comprises 160 selected points from the full $\mu$-law constellation with $d_{min} = 12$. The mapping is suitably accomplished by selecting K=25 and leaving the most significant bit in every other frame as zero. That is, by sending 25, 24, 25, 24 . . . , and so on bits, we are on average sending 24.5 bits per frame.

Referring now to FIG. 5, three curves are plotted in this graph, where the X-axis corresponds to the ring number (indices 0 through 10), and the Y-axis corresponds to the probability of choosing a particular ring during an exemplary mapping session as set forth above. Opt1 curve 502 depicts the theoretically optimum ring probabilities with respect to power achievable assuming infinite framelength and exact values of ring energies. Opt2 curve 504 depicts the theoretically optimum ring probabilities with consideration for transmit power and assuming infinite framelength and approximate ring energies. Shell-mapper curve 506 depicts results in accordance with the method of the present invention wherein the framelength is set at eight and ring energies are approximated as set forth above.

It will be appreciated that curves Opt1 and Opt2 are nearly indistinguishable, thereby confirming the substantial accuracy of the $g(n) = 2^n$ approximation; that is, the observed deviation from optimality in the shell mapper curve is primarily the result of restricted framelength. More particularly, as framelength approaches infinity, the shell mapper curve approaches Opt2.

Significantly, simulation results in accordance with the above parameters have shown that this configuration may advantageously be used to transmit at 56 kbps with a transmit power of only 1.16 dB above that of the optimum distribution.

In summary, the present invention provides methods and apparatus for implementing an optimized shell mapping algorithm in the context of a PCM modem. The proposed shell mapping scheme results in near optimum performance and at the same time provides a computationally efficient implementation.

The present invention has been described above with reference to preferred embodiments. However, those skilled in the art will recognize that changes and modifications may be made to the described embodiments without departing from the scope of the present invention. The present invention may be implemented in a variety of systems, for example, by a processor carrying out software instructions, by hard-wired logic, or by one or more integrated circuit devices configured to implement the shell mapping technique. These and other embodiments are intended to be included within the scope of the present invention, as expressed in the following claims.

What is claimed is:

1. A shell mapping method, said method comprising the steps of:
   receiving digital data in a shell mapper;
   determining the lowest cost N-tuples in accordance with an approximated cost function, wherein N is the mapping frame size, said approximated cost function is proportional to $2^k$, and k is a ring index; and
   mapping K data bits of said digital data uniformly onto an output including $2_k$, of said lowest cost N-tuples, wherein said determining step comprises the steps of:
   dividing a pulse code modulation constellation into M rings, each of said rings being associated with said ring index k; and
   defining said approximated cost function associated with a kth ring as $$P_k = \frac{1}{a_2 - a_1} \int_{a_1}^{a_2} x^2 dx,$$

wherein $a_2 = f(k+1)$, $a_1 = f(k)$ is an exponential function in k.

2. The method of claim 1, wherein $a_1$, $= f(k) = (2^k - 1)b$, $a_2 = f(k+1) = (2^{k+1} - 1)b$, and ring zero ends at a constellation value b.

3. The method of claim 1, wherein said determining step comprises the steps of:
   dividing a pulse code modulation constellation into M rings, each of said M rings being associated with a ring index k,
   defining said approximated cost function associated with a kth ring such that $P_k 2^{ak}$, wherein a is a positive real number chosen to optimize $P_k$ in accordance with said step of dividing a pulse code modulation constellation into M rings.

4. The method of claim 3, wherein a equals two.

5. The method of claim 3, wherein a equals one.

6. The method of claim 2, wherein said approximated cost function is defined as $g(n)=2^n$ and n is a ring index.

7. The method of claim 6, wherein said determining step further comprises the steps of:

deriving a set of intermediate values $c_{ij}$ in accordance with said approximated cost function and said mapping frame size N, wherein $$i \in \left\{1, \ldots, \frac{N}{2}\right\}, j \in \{1, 2\}; \text{ and}$$

computing a set of lowest cost N-tuples $(m_0, m_1, m_2, \ldots, m_{N-1})$ in accordance with said intermediate values $c_{ij}$, wherein $m_0=\log_2(c_{11})$, $m_1=\log_2(c_{12})$, ..., $m_{N-2}=\log_2(c_{N/2,1})$, and $m_{N-1}=\log_2(c_{N/2,2})$.

8. The method of claim 7, wherein:

said mapping frame size N equals 6, said deriving step derives a set of intermediate values $c_{11}$, $c_{12}$, $c_{21}$, $c_{22}$, $c_{31}$, and $c_{32}$; and said computing step computes a set of lowest cost 6-tuples $(m_0, m_1, m_2, \ldots, m_5)$, wherein $m_0=\log_2(c_{11})$, $m_1=\log_2(c_{12})$, $m_2=\log_2(c_{21})$, $m_3=\log_2(c_{22})$, $m_4=\log_2(c_{31})$, and $m_5=\log_2(c_{32})$.

9. The method of claim 7, wherein:

said mapping frame size N equals 8, said deriving step derives a set of intermediate values $c_{11}$, $c_{12}$, $c_{21}$, $c_{22}$, $c_{31}$, $c_{32}$, $c_{41}$, and $c_{42}$; and said computing step computes a set of lowest cost 8-tuples $(m_0, m_1, m_2, \ldots, m_{N-1})$, wherein $m_0=\log_2(c_{11})$, $m_1=\log_2(c_{12})$, $m_2=\log_2(c_{12})$, $m_3=\log_2(c_{22})$, $m_4=\log_2(c_{31})$, $m_5=\log_2(c_{32})$, $m_6=\log_2(c_{41})$, and $m_7=\log_2(c_{42})$.

10. A shell mapping apparatus comprising:

input means for receiving digital data, means for determining the lowest cost N-tuples in accordance with an approximated cost function, wherein N is the mapping frame size, said approximated cost function is proportional to $2^k$, and k is a ring index; and output means for outputting signal points including K data bits mapped onto an output including $2^K$ of said lowest cost N-tuples, wherein said means for determining the lowest cost N-tuples comprises:

a means for dividing a pulse code modulation constellation into M rings, each of said M rings being associated with said ring index k;

said approximated cost function being defined as $$P_k = \frac{1}{a_2 - a_1} \int_{a_1}^{a_2} x^2 \, dx,$$

wherein $a_2=f(k+1)$, $a_1=f(k)$, and $f(k)$, is an exponential function in k.

11. The apparatus of claim 9, wherein said means for determining the lowest cost N-tuples comprises:

a means for dividing a pulse code modulation constellation into M rings, each of said M rings being associated with a ring index k, and said approximated cost function being defined as $P_k \, 2^{ak}$, wherein a is a positive real number chosen to optimize $P_k$ in accordance with said step of dividing a pulse code modulation constellation into M rings.

12. The apparatus of claim 11, wherein a equals two.

13. The apparatus of claim 11, wherein a equals one.

14. The apparatus of claim 10, wherein said approximated cost function is defined as $g(n)=2^n$, wherein n is a ring index.

15. The apparatus of claim 14, wherein said means for determining the lowest cost N-tuples comprises:

a means for deriving a set of intermediate values $c_{ij}$ in accordance with said approximated cost function and said mapping frame size N, wherein $$i \in \left\{1, \ldots, \frac{N}{2}\right\}, j \in \{1, 2\}; \text{ and}$$

A means for computing a set of lowest cost N-tuples $(m_0, m_1, m_2, \ldots, m_{N-1})$ in accordance with said intermediate values $c_{ij}$, wherein $m_0=\log_2(c_{11})$, $m_1, =\log_2(c_{12})$, ..., $m_{N-2}=\log_2(c_{N/2,1})$, and $m_{N-1}=\log_2(c_{N/2,2})$.

16. The apparatus of claim 15, wherein said mapping frame size N equals 6.

17. The apparatus of claim 15, wherein said mapping frame size N equals 8.

* * * * *